United States Patent [19]

Pepper

[11] Patent Number: 5,380,793

[45] Date of Patent: Jan. 10, 1995

[54] STYRENE SOLUBLE UNSATURATED POLYESTER RESIN FROM POLYETHYLENE TEREPHTHALATE

[75] Inventor: Timothy P. Pepper, Dublin, Ohio

[73] Assignee: Ashland Oil, Inc., Russell, Ky.

[21] Appl. No.: 91,488

[22] Filed: Jul. 13, 1993

[51] Int. Cl.$^6$ .................... C08G 63/02; C08L 67/06
[52] U.S. Cl. ................................ 525/48; 528/272; 528/298; 528/300; 528/306; 528/307; 528/308; 528/392; 528/486; 528/495; 528/503; 525/10; 525/39; 525/40; 525/437; 525/445; 521/40; 521/42.5; 521/44; 521/48.5
[58] Field of Search .............. 528/272, 298, 300, 306, 528/307, 308, 392, 486, 495, 503; 525/10, 39, 40, 48, 437, 445; 521/40, 42.5, 44, 48.5

[56] References Cited

U.S. PATENT DOCUMENTS

| | | | |
|---|---|---|---|
| 3,257,335 | 6/1966 | Whitfield, Jr. et al. | 521/48.5 |
| 3,453,240 | 9/1964 | Plaster et al. | 521/48.5 |
| 3,488,298 | 1/1970 | Barkey et al. | 562/48.5 |
| 3,703,488 | 11/1972 | Morton et al. | 521/48.5 |
| 3,825,517 | 7/1974 | Ficarra | 523/521 |
| 3,830,759 | 8/1974 | Barkey et al. | 521/48.5 |
| 3,951,886 | 4/1976 | Miyake et al. | 521/48.5 |
| 4,029,848 | 6/1977 | Nelson | 428/430 |
| 4,055,534 | 10/1977 | Gerber | 524/153 |
| 4,148,765 | 4/1979 | Nelson | 525/7 |
| 4,348,499 | 9/1982 | Nelson | 525/49 |
| 4,360,634 | 11/1982 | Nelson | 525/36 |
| 4,409,360 | 10/1983 | Hefner, Jr. | 524/804 |
| 4,435,530 | 3/1984 | Hefner, Jr. | 523/512 |
| 4,439,550 | 3/1984 | Brennan | 521/131 |
| 4,469,824 | 9/1984 | Grigsby, Jr. | 521/173 |
| 4,539,341 | 9/1985 | Hallmark et al. | 521/172 |
| 4,626,570 | 12/1986 | Gardner | 525/12 |
| 4,753,982 | 6/1988 | Hefner, Jr. | 525/31 |
| 4,758,607 | 7/1988 | Hallmark et al. | 521/172 |
| 4,853,419 | 8/1989 | Hallmark et al. | 521/172 |
| 4,873,268 | 10/1989 | Hallmark et al. | 521/48.5 |

FOREIGN PATENT DOCUMENTS 0277735 1/1988 European Pat. Off. .

OTHER PUBLICATIONS

Encyclopedia of Polymer Science and Engineering 2nd Edition, vol. 12 pp. 268, 267—vol. 4 pp. 537, 538, 539, 540, 541, 542.
Ind. Eng. Chem. Res. 1987, 26, 14–198.
Modern Plastics May 1980.
SPI The Use of Dicyclopentadiene in Polyesters. Smith
SPI Dicyclopentadiene Modification of Polyester Resins to Reduce Production Cost—1979.

*Primary Examiner*—Samuel A. Acquah
*Attorney, Agent, or Firm*—Mary E. Picken

[57] ABSTRACT

This invention is a low cost styrene-soluble unsaturated polyester resin made using recycled or virgin polyethylene terephthalate. The PET is first glycolyzed using inexpensive glycols and then reacted with maleic anhydride and dicyclopentadiene, forming polyesters containing cyclopentadiene added by Diels-Alder reaction and/or norbornyl-terminated polyesters.

38 Claims, No Drawings

STYRENE SOLUBLE UNSATURED POLYESTER RESIN FROM POLYETHYLENE TEREPHTHALATE

This invention relates to a novel unsaturated polyester resin composition and to a process for making such a resin from polyethylene terephthalate (PET). This process uses inexpensive glycols to depolymerize or digest the PET and form an intermediate. The intermediate is reacted with unsaturated acid or anhydride and dicyclopentadiene to provide a resin unexpectedly highly soluble in styrene. These resins are used, when further reacted with styrene to make casting marble. When reinforced with fiberglass they are used to manufacture auto parts and bathroom fixtures.

BACKGROUND

Polyethylene terephthalate (PET), made by reacting terephthalic acid or dimethyl terephthalate and ethylene glycol, is a versatile thermoplastic polyester used in synthetic fibers, extruded films such as x-ray films, molded engineering components, and blow molded bottles. Worldwide production of PET is above 1,000,000 metric tons a year. With such enormous production, effective use of PET waste is desirable. Waste PET is readily available at costs as low as 35 cents per kilogram while its raw materials terephthalic acid and ethylene glycol cost 90 cents per kilogram and 40 cents per kilogram respectively.

PET waste can be repelletized and converted into extruded or molded articles. Alternatively, PET can be converted into low molecular weight oligomers by glycolysis using inexpensive ethylene glycol or diethylene glycol or expensive propylene glycol. Certain of these glycolysis products can be further reacted with an unsaturated acid or anhydride to make an unsaturated polyester resin which can be further reacted with large proportions of styrene to make a myriad of products. Unfortunately, as described by Vaidya and Nadkaini, in Industrial Engineering Chemical Research 1987, 26, 194-198; unsaturated polyester resins synthesized from ethylene glycol-based glycolyzed PET are incompatible with styrene monomer. However, Vaidya and Nadkaini found that PET waste depolymerized with expensive propylene glycol could be reacted with maleic anhydride and mixed with styrene monomer to produce useful unsaturated polyester resins. These resins were comparable in processability to conventional general purpose resin.

It would be economically advantageous if a process could be identified in which PET, glycolyzed using less costly glycols than propylene glycol, could effectively be used in producing styrenated, unsaturated polyester resins for commercial use. Any unsaturated polyester made using glycolyzed PET should be highly soluble in styrene so that manufacturers can use abundant proportions of styrene as they make articles. Some new approach is needed in order to solve the problem, described by Vaidya and Nadkaini, of the incompatibility with styrene monomer of unsaturated polyesters made using ethylene glycol based glycolyzed PET.

OBJECTS

It is, therefore, an object of this invention, to provide a method of enhancing the styrene solubility of unsaturated polyesters made from PET depolymerized using inexpensive glycols.

A further object of this invention is to identify a reactive monomer or coreactant which will enhance the solubility of a polyester resin in styrene.

BROAD STATEMENT OF THE INVENTION

In one aspect this invention is a method of making a scrap PET glycolysate into an unsatuated polyester resin highly soluble in styrene by incorporating dicyclopentadiene or cyclopentadiene into the resin. In another aspect this invention is the use of a PET glycolysate made using inexpensive ethylene glycol or diethylene glycol.

DETAILED DESCRIPTION OF THE INVENTION

The first ingredient in the polyester resin of this invention is PET or scrap PET. Scrap PET is readily available from Morgan and Company, Shelby, N.C. and Martin Colorfi, Trenton, S.C.

PET has the structure:

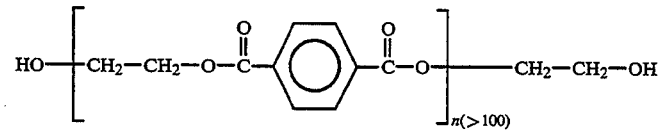

If the glycolysis of PET is carried out with excess amounts of ethylene glycol, the same structure is formed but n is now estimated to be less than ten. Glycolysis with other glycols will yield low molecular weight terephthalate oligomers. Glycols that yield particularly soluble unsaturated polyesters in styrene are propylene glycol, dipropylene glycol, and neopentyl glycol. These are relatively expensive. Ethylene glycol and diethylene glycol yield relatively insoluble polyester resins in styrene, but have economic advantages because they are relatively cheaper.

In addition to using ethylene glycol or diethylene glycol to digest PET, another useful glycol source is the B-270 mixed glycol and monomer stream available from Eastman Chemical Products, Inc., Kingsport, Tenn. which contains ethylene glycol, diethylene glycol, triethylene glycol and 1,4-cyclohexane dimethanol.

Unsaturated polyesters can be formed by reacting the PET glycolysate with $\alpha, \beta$ unsaturated acid or anhydride. Among the useful unsaturated acids and anhydrides are: maleic acid, maleic anhydride, fumaric acid, aconitic acid, mesaconic acid, citraconic acid, itaconic acid and halo and alkyl derivatives of such acids; the preferred acid and anhydride being maleic acid and maleic anhydride. Mixed streams may also be used.

It was found that PET glycolysates made using ethylene glycol or diethylene glycol and then esterified with unsaturated acid or anhydride were not sufficiently soluble in styrene. "Solubility in styrene" is a test which is especially important to the user of unsaturated polyester resins. The styrene is required to further react, or "cure" the resin in forming final products. It is also used to adjust the viscosity for proper processing properties. In addition, since styrene generally costs less than polyester resin, the user wants to use as much styrene as possible and generally wants to be able to combine approximately equal parts polyester resin and styrene. This formulation is made by determining the percent dry weight of the resin product and then adding enough styrene to give a 50% styrene content final formulation. Experimentally, when resins are soluble in an equal weight of styrene, inspection of the mixture shows a homogeneous liquid. When resins are not soluble in an equal weight of styrene, the mixture separates into two distinct layers. Typically, a resin may be soluble in 30% or 40% styrene but not soluble in 50% or 60% styrene. According to this invention, a resin made from PET which is not soluble in 30%, 40%, 50% or 60% styrene, is made soluble in 30%, 40%, 50% or 60% styrene by introducing DCPD into the resin. In this application when a resin is described as "soluble in 50% styrene" the phrase is meant to include from 45% to 55% styrene.

Dicyclopentadiene is a well-known, readily available raw material available from the petroleum industry. The report by P. L. Smith et al. "The Use of Dicyclopentadiene in Polyesters" Proceedings of the 22nd Annual Technical Conference. Society of the Plastics Industry, Reinforced Plastics Division, Washington, D.C. (1967) describes modifying polyesters with a concentrated dicyclopentadiene extract. Various levels of purity are available and all are useful in this invention.

There are two different reactions in which dicyclopentadiene (DCPD) is incorporated into polyester resins. Which manner of addition occurs depends on the sequence of addition and the reaction conditions.

When DCPD is reacted so as to be the terminal group the polymer is a norbornyl terminated unsaturated polyester resin (FIG. 1). This can be effected by adding the acid directly across one of the double bonds of the DCPD, or forming the DCPD alcohol, and then esterifying through a condensation reaction. Preparation of norbornyl terminated unsaturated polyester resins is taught by: U.S. Pat. Nos. 4,029,848; 4,117,030; 4,148,765; 4,167,542; 4,233,432; 4,246,367; 4,348,499; 4,360,634; 4,409,371; 4,410,686; 4,435,530; 4,471,101; 4,753,982;
which are incorporated herein by reference. Any polyester having hydroxyl or carboxyl terminal groups can be reacted with a norbornyl radical to form such norbornyl terminated polyester resins.

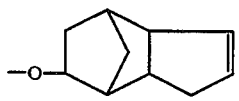

(I)

Dicyclopentadiene can also be incorporated into an unsaturated polyester using another reaction, where dicyclopentadiene serves as source of cyclopentadiene, a highly reactive monomer. This conjugated diene monomer readily undergoes a Diels-Alder reaction with carbon-carbon double bonds present in the resin structure to form cyclohexene derivatives having a bridged ring or endomethylene group (FIG. II). This structure may be referred to as "nadic" which is an abbreviation of endomethylene tetrahydrophthalic or "norbornene dicarboxylic". When glycol and maleic anhydride are polyesterified at approximately 200° C. followed by reaction with dicyclopentadiene at 160°-170° C. the Diels-Alder reaction product is formed as described in U.S. Pat. Nos. 4,233,432 and 3,825,517. This polyester contains the following structural unit resulting from Diels-Alder reaction of dicyclopentadiene with a maleate/fumarate unit in the unsaturated polyester chain

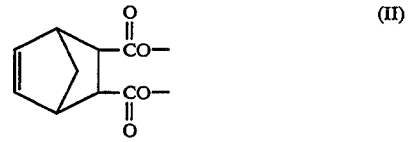

(II)

The α, β-unsaturated polycarboxylic acid is preferably maleic acid, fumaric acid, the anhydride of maleic acid, or mixtures of these compounds. Such acids are readily available, have good reactivity with the glycolysis product intermediate, and result in products of good properties.

Other less preferred polycarboxylic acids and anhydrides such as phthallic anhydride, isophthalic acid, itaconic acid, cyclohexane dicarboxylic acid, terephthalic acid, adipic acid, sebacic acid, azelaic acid, and glutaric acid can be added to mixtures of maleic and fumaric acids in making unsaturated polyester resins. The total amount of acid or anhydride varies as a function of the total polyol and norborene ingredients used.

The styrene-soluble unsaturated polyester resins of this invention are soluble in other unsaturated diluents including methyl methacrylate, vinyl toluene, paramethyl styrene, divinyl benzene and diallyl phthalate including mixtures thereof.

Additionally, conventional additives are incorporated into the novel resin. Accordingly, suitable curing agents, low profile additives, accelerating agents, and the like are incorporated. Reinforcement and inert additives and fillers such as glass, metal filings, and inorganic fillers such as sand or clay also are appropriate. Pigments, release agents, plasticizers, and the like also are used as is necessary, desirable, or convenient in conventional fashion. The compounding of such polyester resin compositions is well known in the art.

The following Examples describe the method and compositions of this invention. All units are in the metric system unless expressly stated otherwise. Further, all references cited herein are expressly incorporated by reference.

MATERIALS

Recovered Polyethylene terephthalate (PET) film from x-ray film was obtained from American Repet. Diethylene (DEG), ethylene glycol (EG) and propylene glycol (PG) were obtained from Dow Chemical. Dicyclopentadiene (DCPD) of 98% purity was obtained from Exxon Chemical. Technical grade hydroquinone was obtained from Eastman Chemicals. High purity styrene containing 50 ppm tertiary-butylcatechol inhibitor (TBC) was obtained from Arco Chemical Co. or Amoco and can be used interchangeably. Maleic anhydride (MAN) briquettes were obtained from Ashland Chemical, Inc.

Example 1 describes the glycolysis of PET scrap film, the preparation of unsaturated polyester (UP) resins from the glycolyzates and solubilizing the unsaturated polyester resins using dicyclopentadiene to form a Diels-Alder product.

EXAMPLE 1

GLYCOLYSIS OF PET

PET film was charged to a 3 liter reaction kettle with a detachable 4 neck lid. A stirrer, thermocouple, nitrogen sparge and full condenser were attached. The glycol was then charged, keeping the amount of ethylene glycol to a minimum necessary to glycolyze the PET. The mixture was then brought to a stirring reflux with a constant nitrogen sparge. These mixtures were reacted until they became homogeneous. Any ethylene glycol that had been held out was added at this point. The resulting products are labelled according to the charges, i.e., if an original charge was 27% EG, and 73% PET, the label would be PETEG27. The charges run are labelled and listed below in Table 1.

TABLE 1

|  | PET | | EG | | DEG | | PG | |
| --- | --- | --- | --- | --- | --- | --- | --- | --- |
|  | grams | moles | grams | moles | grams | moles | grams | moles |
| PET-EG 21 | 788 | 4.10 | 212 | 3.42 | | 0 | 0 | |
| PET-EG 41 | 591 | 3.08 | 409 | 6.60 | | 0 | 0 | |
| PET-EG 76 | 236 | 1.23 | 764 | 12.3 | | 0 | 0 | |
| PET-DEG 39 | 613 | 3.19 | 0 | | 387 | 3.65 | 0 | |
| PET-DEG 40 | 600 | 3.13 | 0 | | 400 | 3.77 | | |
| PET-DEG 40 | 598 | 3.11 | 0 | | 0 | | 402 | 5.29 |
| PET-DEG 30 | 698 | 3.63 | 0 | | 302 | 2.85 | | |
| PET-EG 47 | 537 | 2.80 | 463 | 7.47 | | 0 | 0 | |
| PET-DEG 30 EG 17 | 533 | 2.78 | 172 | 2.78 | 295 | 2.78 | 0 | |
| PET-DEG 9 EG 34 | 570 | 2.97 | 89 | 1.44 | 341 | 3.22 | 0 | |
| PET-DEG 26 EG 15 | 594 | 3.09 | 149 | 2.40 | 257 | 2.40 | 0 | 0 |

PREPARATION OF UNSATURATED POLYESTER (UP) RESINS

The UP resins were prepared by reacting the glycolyzed products with maleic anhydride (MAN) to give a theoretical ratio of 1.1/1 hydroxyl to carboxyl group. The reaction was carried out in the same kettle as the digestion. The reflux condenser was replaced with a distillation column. The reaction was heated to 430° F. (221° C.), maintaining a column top temperature of 212° (100° C.) to 220° F. (105° C.). Once the column top temperature dropped below 200° F., the sparge tube was pushed to the bottom of the kettle, and turned on high. Each resin was reacted to below a 30 acid number (AN) and checked for solubility in 50% styrene and acid number. Only the PET-PG40 gave a solution in 50% styrene. The other products were incompatible with 50% styrene and separated into two layers.

PREPARATION OF DICYCLOPENTADIENE-PET GLYCOLYZATE UNSATURATED POLYESTER RESINS

The styrene insoluble resins were cooled to 360° F. (182° C.), and a reflux condenser replaced the distilled column. The sparge was turned off. The noted charge of DCPD was added dropwise over approximately 1 hour. The reaction was held an additional hour at 360° F. (182° C.). The reflux condenser was once again replaced with a distillation column, and the sparge turned on. The cook temperature was brought up to 410° F. (210° C.) and held for approximately one hour. The polyester was then thinned into inhibited styrene, and cooled to room temperature. Six of the styrene insoluble polyesters were treated in this fashion. All six products were now soluble in 50% styrene.

TABLE 2

|  |  | CHARGE | |
| --- | --- | --- | --- |
|  |  | parts | moles |
| 1 | PET-DEG 30 | 783 | |
|  | MAN | 186 | 1.80 |
|  | DCPD | 31 | 0.23 |
| 2 | PET-DEG 40 | 738 | |
|  | MAN | 231 | 2.36 |
|  | DCPD | 31 | 0.29 |
| 3 | PET-EG 47 | 531 | |
|  | MAN | 341 | 3.47 |
|  | DCPD | 125 | 0.98 |
| 4 | PET-DEG 47 | 625 | |
|  | MAN | 340 | 3.12 |
|  | DCPD | 69 | 0.52 |
| 5 | PET-DEG 9 EG 34 | 567 | |
|  | MAN | 306 | 3.12 |
|  | DCPD | 127 | 0.96 |
| 6 | PET-DEG 26 EG 15 | 651 | |
|  | MAN | 270 | 2.76 |
|  | DCPD | 79 | 0.60 |

EXAMPLE 2

Example 2 describes the preparation of a styrene soluble unsaturated polyester by the reaction of a PET glycolyzate with maleic anhydride, and the reaction product of maleic anhydride and dicyclopentadiene forming a norbornyl terminated unsaturated polyester resin.

DCPD (1057 parts, 8.0 moles) and water (159 parts, 8.8 moles) were charged to a liter reactor equipped with a detachable lid, stirrer, nitrogen sparge, thermocouple and reflux condenser. Maleic anhydride (784 parts, 8.0 moles) was slowly added to the reactor in order to control the exotherm. The reaction temperature was maintained at 250°–270° F. (121°–132° C.) for 2.5 hours.

The above DCPD, water and maleic anhydride reaction mixture (336 parts), PET DEG 47 glycolysate (2231 parts) and additional maleic anhydride (593 parts, 605 moles) were reacted in a 3 liter flask equipment with a stirrer nitrogen sparge, thermocouple and distillation column at 420° F. (215° C.) until an acid value of 10 was obtained.

The resulting norbornyl terminated unsaturated polyester resin product was soluble in 50% styrene, whereas the product made using PET DEG 47 glycolysate and maleic anhydride, but without DCPD was insoluble in 50% styrene.

Examples 3, 4 and 5 describe the production of styrene soluble unsaturated polyesters using PET glycolysate and DCPD which has been incorporated into the polyesters as both norbornyl terminated and Diels-Alder adducts.

EXAMPLE 3

PET DEG 39 glycolysate (2081 parts) was charged to a 3 liter reactor equipped with a stirrer, nitrogen sparge, thermocouple and reflux condenser. The glycolysate was heated to 190° F. (88° C.), then water (131 parts, 7.28 moles), maleic anhydride (651 parts, 6.64 moles) and DCPD (88 parts, 0.67 moles) were charged to the reactor. The reaction was continued at 260° F. (127° C.) for 2 hours. The reflux condenser was replaced with a distillation column and mixture was reacted at 420° F. (215° C.) until an acid value of 11 was obtained.

The resulting product was soluble in 50% styrene, whereas the product made using the PET DEG 39 glycolysate and maleic anhydride, but without DCPD, was insoluble in 50% styrene.

EXAMPLE 4

DCPD (91 parts, 0.69 moles) and water (14 parts, 0.78 moles) were charged to a 3 liter reactor equipped with a stirrer, thermocouple, nitrogen sparge and reflux condenser. Maleic anhydride (67.5 parts, 0.69 moles) was slowly added to the reactor and then the mixture was heated to 250°–270° F. (121°–132° C.) for 2.5 hours.

The reflux condenser was replaced with a distillation column and PET DEG 40 glycolsate (2200 parts) and maleic anhydride (675 parts, 6.89 moles) were charged to the reactor. The mixture was heated at 420° F. (215° C.) until an acid value of 30 was obtained.

The resin was cooled to 360° F. (182° C.) and DCPD (91 parts, 0.69 moles) was added to the reactor. The reaction was continued at 360° F. (182° C.) for an additional 2 hours. The reflux condenser was replaced with a distillation column and the mixture reacted at 420° F. (215° C.) until an acid value of less than 20 was obtained.

The resulting unsaturated polyester resin was soluble in 50% styrene.

EXAMPLE 5

DCPD (457 parts, 3.46 moles) and water (68 parts, 3.78 moles) were charged to a 3 liter reactor equipped with stirrer, thermocouple, nitrogen sparge and reflux condenser. Maleic anhydride 33 parts, 3.46 moles was slowly added to the reactor and then the mixture was heated to 250°–270° F. (121°–132° C.) for 2.5 hours.

The mixture was heated to 320° F. (160° C.) and then DCPD (228 parts, 1.73 moles) was added to the reactor. The reaction was continued for an additional 3 hours at 360° F. (182° C.).

PET (929 parts, 4.84 moles) and EG (407 parts, 6.56 moles) were charged to the reactor. The reflux condenser was replaced with a distillation column. The mixture was reacted at 430° F. (221 ° C.) until the mixture became homogeneous.

The mixture was cooled to 340° F. (171° C.) and then maleic anhydride (677 parts, 6.91 moles and EG (150 parts, 2.42 moles) were charged to the reactor. The mixture was reacted at 410° F. (210° C.) until an acid value of less than 30 was obtained.

The resulting unsaturated polyester was soluble in 50% styrene.

I claim:

1. A method for making a styrene-soluble ethylenically-unsaturated polyester which comprises the steps of:
   (a) depolymerizing polyethylene terephthalate with a glycol forming an intermediate having hydroxyl groups,
   (b) re-esterifying said depolymerized polyethylene terephthalate intermediate with an alpha, beta ethylenically unsaturated dicarboxylic acid or anhydride and,
   (c) reacting said unsaturated polyester with an effective amount of cyclopentadiene or dicyclopentadiene.

2. The method of claim 1 wherein said glycol is dipropylene glycol, neopentyl glycol, cyclohexane dimethanol, ethylene glycol, diethylene glycol, triethylene glycol, or 2 methyl 1,3 propane diol, or mixtures thereof.

3. The method of claim 2 comprising depolymerizing polyethylene terephthalate with a glycol in the absence of propylene glycol.

4. The method of claim 3 comprising
   5 to 70 moles polyethylene terephthalate,
   30 to 125 moles glycol,
   30 to 95 moles unsaturated acid or anhydride, and
   2 to 95 moles cyclopentadiene or 1 to 47.5 moles dicyclopentadiene.

5. The method of claim 4 comprising
   40 to 60 moles polyethylene terephthalate
   60 to 70 moles glycol
   50 to 60 moles unsaturated acid or anhydride, and
   20 to 30 moles cyclopentadiene, or
   10 to 15 moles dicyclopentadiene.

6. The method of claim 5 wherein said glycol is ethylene glycol or diethylene glycol or mixtures thereof, and said anhydride is maleic anhydride.

7. A method of making a styrene-soluble ethylenically-unsaturated norbornyl terminated polyester resin comprising prereacting dicyclopentadiene, water and unsaturated acid or anhydride, adding a hydroxyl terminated intermediate made by depolymerizing polyethylene terephthalate with a glycol, and, heating.

8. The method of claim 7 wherein said glycol is cyclohexane dimethanol, diethylene glycol, dipropylene glycol, ethylene glycol, neopentyl glycol, triethylene glycol, or 2 methyl 1,3 propane diol or mixtures thereof.

9. The method of claim 8 comprising depolymerizing polyethylene terephthalate with a glycol in the absence of propylene glycol.

10. The method of claim 9 comprising:
    2 to 95 moles cyclopentadiene, or 1 to 47.5 moles dicyclopentadiene,
    2 to 105 moles water,
    30 to 95 moles unsaturated acid or anhydride,
    5 to 70 moles polyethylene terephthalate, and
    30 to 125 moles glycol.

11. The method of claim 10 wherein said glycol is ethylene glycol or diethylene glycol or mixtures thereof and said anhydride is maleic anhydride.

12. The method of claim 10 comprising
    40 to 60 moles polyethylene terephthalate,
    60 to 70 moles glycol,
    50 to 60 moles unsaturated acid or anhydride, and
    20 to 30 moles cyclopentadiene or
    10 to 15 moles dicyclopentadiene.

13. A method of making a norbornyl terminated unsaturated polyester resin also containing tetrahydro-endo-methylene phthalic groups comprising reacting unsaturated anhydride with water and dicyclopentadiene to form norbornyl terminated unsaturated acid, adding a hydroxyl terminated intermediate made by depolymerizing polyethylene terephthate with a glycol, adding additional dicyclopentadiene, and heating.

14. The method of claim 13 wherein said glycol is ethylene glycol.

15. The method of claim 13 wherein said glycol is cyclohexane dimethanol, diethylene glycol, dipropylene glycol, ethylene glycol, neopentyl glycol, triethylene glycol, or mixtures thereof.

16. The method of claim 13 wherein polyethylene terephthalate is depolymerized with solubilizing glycol in the absence of propylene glycol.

17. The method of claim 13 comprising:
30 to 95 moles unsaturated anhydride,
2 to 105 moles water,
2 to 95 moles dicyclopentadiene,
5 to 70 moles polyethylene terephthalate,
30 to 125 moles glycol and
2 to 45 moles additional dicyclopentadiene.

18. The method of claim 13 wherein said glycol is ethylene glycol or diethylene glycol or mixtures thereof and said anhydride is maleic anhydride.

19. The method of claim 13 comprising
40 to 60 moles polyethylene terephthalate,
60 to 70 moles glycol
50 to 60 moles unsaturated acid or anhydride,
5 to 15 moles water,
5 to 12.5 moles dicyclopentadiene and,
5 to 12.5 moles additional dicyclopentadiene.

20. An unsaturated polyester resin composition soluble in styrene and useful for manufacture of gel coats, auto parts and bathroom fixtures comprising the reacted mixture of:
a) a hydroxyl terminated intermediate made by depolymerizing polyethylene terephthalate with a glycol,
b) an alpha, beta ethylenically unsaturated acid, and
c) cyclopentadiene or dicyclopentadiene.

21. The composition of claim 20 wherein said glycol is cyclohexane dimethanol, diethylene glycol, dipropylene glycol, ethylene glycol, neopentyl glycol, 2 methyl 1,3 propane diol or triethylene glycol, or mixtures thereof.

22. The composition of claim 20 wherein polyethylene terephthalate is depolymerized with a glycol in the absence of propylene glycol.

23. The composition of claim 20 comprising
5 to 70 moles polyethylene terephthalate,
30 to 125 moles glycol,
30 to 95 moles unsaturated acid or anhydride and
2 to 95 moles cyclopentadiene or 1 to 47.5 moles dicyclopentadiene.

24. The composition of claim 20 wherein said glycol is ethylene glycol or diethylene glycol or mixtures thereof and said anhydride is maleic anhydride.

25. The composition of claim 24 comprising
40 to 60 moles polyethylene terephthalate
60 to 70 moles glycol
50 to 60 moles unsaturated acid or anhydride, and
20 to 30 moles cyclopentadiene or
10 to 15 moles dicyclopentadiene 26. A norbornyl terminated unsaturated polyester resin composition soluble in styrene and useful for manufacture of gel coats, auto parts and bathroom fixtures, comprising the reacted mixture of:
a) dicyclopentadiene prereacted with water and unsaturated acid or anhydride, and
b) a hydroxyl terminated intermediate made by depolymerizing polyethylene terephthalate with solubilizing glycol.

27. The composition of claim 26 wherein said glycol is cyclohexane dimethanol, diethylene glycol, ethylene glycol, neopentyl glycol, triethylene glycol, or 2 methyl 1,3 propane diol or mixtures thereof.

28. The composition of claim 26 wherein polyethylene terephthalate is depolymerized with a glycol in the absence of propylene glycol.

29. The composition of claim 26 comprising:
2 to 95 moles cyclopentadiene or 1 to 47.5 moles dicyclopentadiene,
2 to 105 moles water,
30 to 95 moles unsaturated acid or anhydride,
5 to 70 moles polyethylene terephthalate, and
30 to 125 moles glycol 30. The composition of claim 29 wherein said glycol is ethylene glycol or diethylene glycol or mixtures thereof and said anhydride is maleic anhydride.

31. The composition of claim 30 comprising
40 to 60 moles polyethylene terephthalate,
60 to 70 moles glycol
50 to 60 moles unsaturated acid or anhydride, and
20 to 30 moles cyclopentadiene or
10 to 15 moles dicyclopentadiene.

32. A norbornyl terminated unsaturated resin composition, soluble in styrene and useful for manufacture of gel coats, auto parts and bathroom fixtures, comprising the reacted mixture of:
a) dicyclopentadiene prereacted with water and an alpha, beta ethylenically unsaturated acid or anhydride,
b) a hydroxyl terminated intermediate made by depolymerizing scrap polyethylene terephthalate with a solubilizing glycol,
c) dicyclopentadiene, and
d) additional unsaturated acid or anhydride.

33. The composition of claim 32 wherein said solubilizing glycol is cyclohexane dimethanol, diethylene glycol, dipropylene glycol, ethylene glycol, neopentyl glycol, triethylene glycol or 2 methyl 1,3 propane diol or mixtures thereof.

34. The composition of claim 32 wherein polyethylene terephthalate is depolymerized with a solubilizing glycol in the absence of propylene glycol.

35. The composition of claim 32 comprising
2 to 95 moles dicyclopentadiene,
2 to 105 moles water,
30 to 95 moles unsaturated acid or anhydride,
5 to 70 moles polyethylene terephthalate,
30 to 125 moles glycol, and
2 to 45 moles additional cyclopentadiene.

36. The composition of claim 32 wherein said glycol is ethylene glycol or diethylene glycol or mixtures thereof and said anhydride is maleic anhydride.

37. The composition of claim 35 comprising
40 to 60 moles polyethylene terephthalate
60 to 70 moles glycol
50 to 60 moles unsaturated acid or anhydride
10 to 15 moles dicyclopentadiene, and
10 to 15 moles additional dicyclopentadiene 38. A method for making a styrene-soluble ethylenically unsaturated polyester in one pot which comprises the steps of reacting an unsaturated anhydride with water and dicyclopentadiene to form norbornyl terminated unsaturated acid, adding additional dicyclopentadiene, adding polyethylene terephthalate and glycol, and heating, whereby a norbornyl terminated unsaturated polyester resin containing tetra hydro-endo-methylene phthalic groups is formed.

* * * * *